United States Patent
Maeta et al.

(10) Patent No.: US 10,513,168 B2
(45) Date of Patent: Dec. 24, 2019

(54) VEHICULAR OPTICAL SYSTEM

(71) Applicant: TOYOTA JIDOSHA KABUSHIKI KAISHA, Toyota-shi, Aichi-ken (JP)

(72) Inventors: Daisuke Maeta, Toyota (JP); Takahiro Adachi, Toyota (JP); Takeki Mori, Nagoya (JP); Kazumi Chida, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 52 days.

(21) Appl. No.: 15/881,096

(22) Filed: Jan. 26, 2018

(65) Prior Publication Data

US 2018/0215239 A1    Aug. 2, 2018

(30) Foreign Application Priority Data

Jan. 30, 2017 (JP) .................. 2017-014492

(51) Int. Cl.
*B60J 1/00* (2006.01)
*H04N 7/18* (2006.01)

(52) U.S. Cl.
CPC .............. *B60J 1/002* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2004/0032668 A1* | 2/2004 | Schaefer | B60R 11/04 359/642 |
| 2006/0127081 A1* | 6/2006 | Lee | G09G 3/3406 396/282 |
| 2009/0219244 A1* | 9/2009 | Fletcher | G09G 3/3406 345/102 |
| 2012/0119104 A1 | 5/2012 | Arslan et al. | |
| 2016/0089041 A1* | 3/2016 | Keat | A61B 5/72 600/479 |
| 2016/0091714 A1* | 3/2016 | Hui | H04N 5/2251 359/512 |
| 2017/0022607 A1 | 1/2017 | Shibusawa | |

FOREIGN PATENT DOCUMENTS

| | | |
|---|---|---|
| EP | 1 405 718 A1 | 4/2004 |
| JP | H07-019701 U | 4/1995 |
| JP | H11-084473 A | 3/1999 |
| JP | 2002-350966 A | 12/2002 |

(Continued)

*Primary Examiner* — Clifford Hilaire
(74) *Attorney, Agent, or Firm* — Oliff PLC

(57) ABSTRACT

A vehicular optical system includes an optical device disposed to acquire information on an environment outside a vehicle cabin, a transparent member disposed on a front surface of the optical device via a predetermined closed space, an anti-fogging sheet disposed in a first region of an inner surface of the transparent member in the closed space, the first region being within an angle of view of the optical device, and a dew condensation portion disposed in a second region of the inner surface of the transparent member in the closed space, the second region being out of the angle of view of the optical device and dew condensation being more likely to occur in the dew condensation portion than in the first region.

4 Claims, 2 Drawing Sheets

(56) References Cited

FOREIGN PATENT DOCUMENTS

| | | |
|---|---|---|
| JP | 2004-276857 A | 10/2004 |
| JP | 2008-239018 A | 10/2008 |
| JP | 2015-169816 A | 9/2015 |
| JP | 2016-205825 A | 12/2016 |
| WO | 2006/112529 A1 | 10/2006 |
| WO | 2015/115399 A1 | 8/2015 |
| WO | 2016/129699 A1 | 8/2016 |

* cited by examiner

[ENLARGED VIEW OF MAIN PART]

[SECTIONAL VIEW TAKEN ALONG LINE II-II]

VEHICULAR OPTICAL SYSTEM

INCORPORATION BY REFERENCE

The disclosure of Japanese Patent Application No. 2017-014492 filed on Jan. 30, 2017 including the specification, drawings and abstract is incorporated herein by reference in its entirety.

BACKGROUND

1. Technical Field

The present disclosure relates to an optical system mounted in a vehicle.

2. Description of Related Art

A vehicular optical system is known that acquires information on the environment in front of and behind a vehicle by using an optical device including a camera and so on and uses the information to assist in the driving of the vehicle by a driver. In most cases, the vehicular optical system is installed on the inner side of a windshield or a rear window, which is inside the vehicle cabin of the vehicle.

The vehicular optical system described above may not be operated properly when a lens and glass in front of the optical device becomes foggy due to, for example, the difference between the temperature of the air inside the vehicle and the temperature of the air outside the vehicle. In this regard, the glass and the lens are restrained from becoming foggy by an anti-fogging portion (such as an anti-fogging sheet, an anti-fogging film, and a hydrophilic film) that has an anti-fogging performance being disposed in the glass and the lens. This type of structure is disclosed in, for example, Japanese Unexamined Patent Application Publication No. 2002-350966 (JP 2002-350966 A), Japanese Unexamined Patent Application Publication No. 11-084473 (JP 11-084473 A), and Japanese Unexamined Patent Application Publication No. 2008-239018 (JP 2008-239018 A).

SUMMARY

In the structures disclosed in JP 2002-350966 A, JP 11-084473 A, and JP 2008-239018 A, however, the anti-fogging portion disposed in front of the optical device becomes foggy when the anti-fogging performance of the anti-fogging portion exceeds a limit. In other words, a transparent member such as the glass that is in front of the optical device and within the angle of view of the optical device becomes foggy when the anti-fogging performance of the anti-fogging portion exceeds a limit. Then, the vehicular optical system may not be operated properly.

The disclosure provides a vehicular optical system that is capable of suppressing the possibility of the system not being operated properly by a transparent member becoming foggy with the transparent member in front of an optical device and within the angle of view of the optical device.

An aspect relates to a vehicular optical system. The vehicular optical system includes an optical device, a transparent member, an anti-fogging sheet, and a dew condensation portion. The optical device is disposed to acquire information on an environment outside a vehicle cabin. The transparent member is disposed on a front surface of the optical device via a predetermined closed space. The anti-fogging sheet is disposed in a first region of an inner surface of the transparent member in the closed space, the first region being within an angle of view of the optical device. The dew condensation portion is disposed in a second region of the inner surface of the transparent member in the closed space, the second region being out of the angle of view of the optical device and dew condensation being more likely to occur in the dew condensation portion than in the first region.

According to the aspect, dew condensation by the dew condensation portion can be preferentially performed before moisture absorption by the anti-fogging sheet, the moisture (water vapor) that is included in the closed space and causes the transparent member to become foggy is allowed to concentrate in the dew condensation portion, and thus the amount of the moisture in the anti-fogging sheet can be decreased. Accordingly, the anti-fogging sheet becomes unlikely to reach a moisture absorption limit and the anti-fogging properties of the first region (an angle of view) in front of the optical device are improved.

In the vehicular optical system according to the aspect, the dew condensation portion may be formed by a thickness of the transparent member being thinner in the second region than in the first region.

According to the aspect, the thermal conductivity of the transparent member can be improved more in the second region (out of the angle of view) than in the first region (angle of view) without any new configuration being added.

In the vehicular optical system according to the aspect, the dew condensation portion may be formed by a surface area of the transparent member per coating area being larger in the second region than in the first region.

According to the aspect, the efficiency of heat exchange of the transparent member per coating area can be improved more in the second region (out of the angle of view) than in the first region (angle of view) without any new configuration being added.

In the vehicular optical system according to the aspect, the transparent member may be a part of a windshield.

According to the aspect, the anti-fogging properties of the first region (angle of view) can be improved in a situation in which the temperature of the air outside the vehicle cabin of the windshield and the temperature of the air inside the vehicle cabin of the windshield differ from each other.

With the vehicular optical system according to the aspect, the possibility of the system not being operated properly by a transparent member such as glass becoming foggy can be suppressed as described above with the glass in front of an optical device and within the angle of view of the optical device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Overview

A vehicular optical system decreases the amount of moisture in the region of the angle of view of an optical device by allowing the moisture that is included in a closed space to concentrate in a region of the inner surface of a transparent member that is out of the angle of view of the optical device with the closed space formed by the optical device and the transparent member such as a windshield being attached to each other. As a result, the possibility of the system becoming inoperable by the transparent member on the front surface of the optical device becoming foggy can be suppressed.

Configuration of Vehicular Optical System

Figure 1:
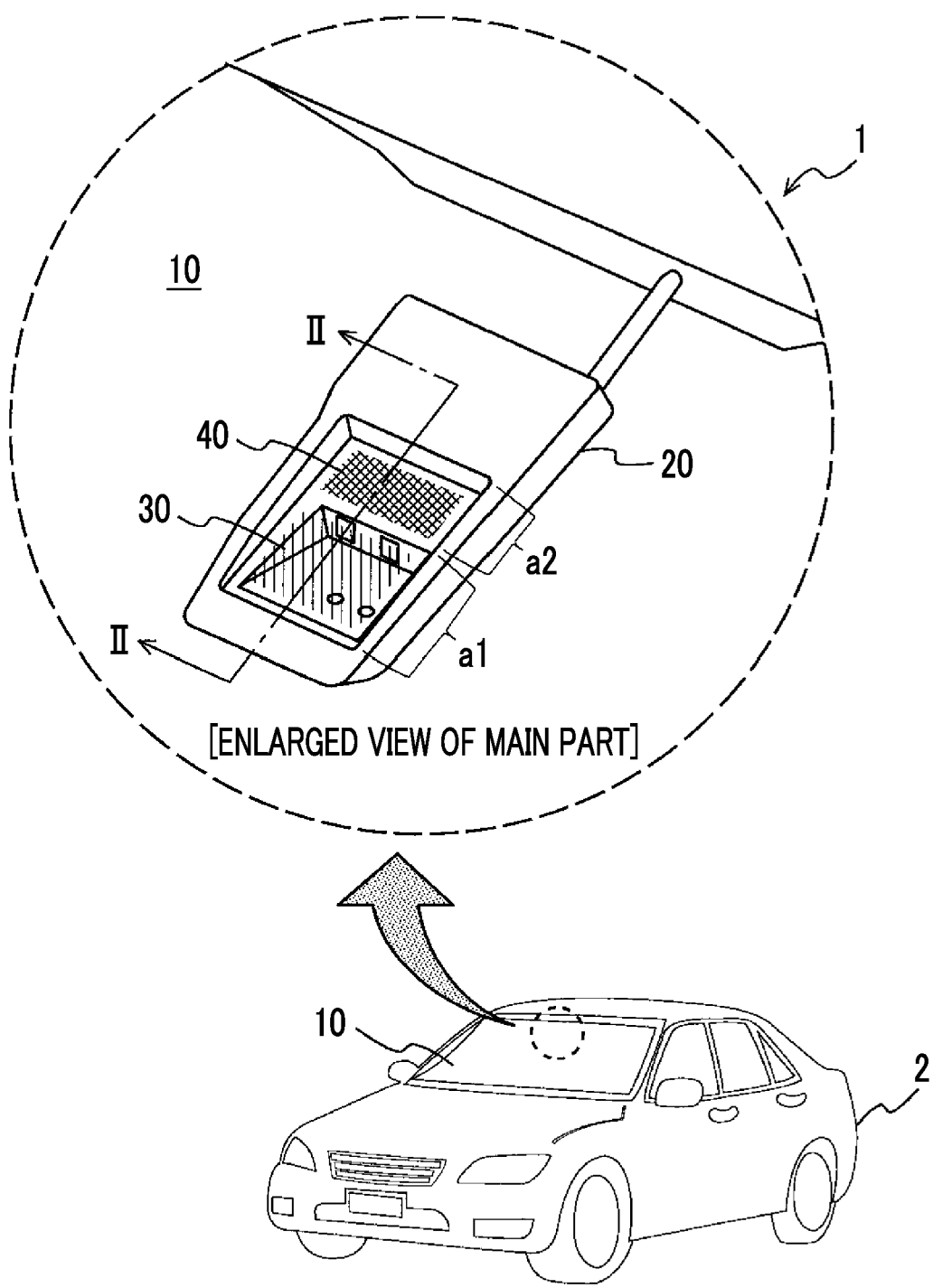
FIG. 1 is a schematic configuration diagram of a vehicular optical system according to an embodiment and an enlarged view of its main part.
Figure 2:
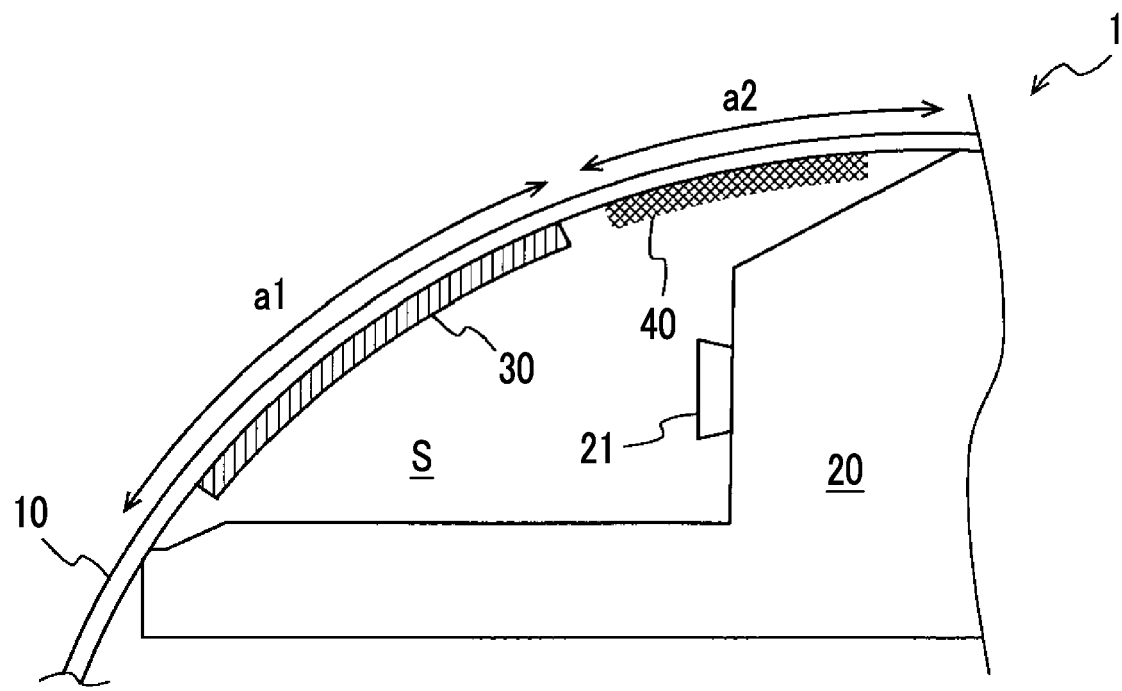
FIG. 2 is a sectional view taken along line II-II of the vehicular optical system illustrated in FIG. 1.

A diagram illustrating a schematic configuration of a vehicular optical system 1 according to an embodiment and an enlarged view of its main part are illustrated in FIG. 1. FIG. 2 is a sectional side view taken along line II-II of the enlarged view of the main part of the vehicular optical system 1 that is illustrated in FIG. 1.

As illustrated in FIGS. 1 and 2, the vehicular optical system 1 according to the present embodiment is configured to be provided with a transparent member 10, an optical device 20, an anti-fogging portion 30, and a dew condensation portion 40.

The transparent member 10 is, for example, a part of the glass of a windshield that transmits visible light. The glass of the windshield may be glass on the front side of a vehicle 2 or glass on the rear side of the vehicle 2. The transparent member 10 may also be a transparent acrylic plate or the like instead of the glass of the windshield. In the following embodiment, the vehicular optical system 1 will be described on the assumption that the transparent member 10 is a part of the windshield (hereinafter, the transparent member 10 will be referred to as a "windshield 10").

The optical device 20 is disposed on, for example, the inner side of the windshield 10 that is in the vehicle cabin. The optical device 20 is provided with an optical unit 21 such as an imaging camera and/or a laser sensor. The imaging camera captures images around the vehicle and the laser sensor detects targets present around the vehicle. The optical device 20 is configured to be capable of acquiring information on the environment that is in front of the vehicle cabin of the vehicle 2 through the windshield 10. The information acquired by the optical device 20 is used by an in-vehicle preventive safety system (not illustrated) for collision avoidance assistance or the like.

As illustrated in PG 2, the optical device 20 is disposed with a predetermined closed space S formed between the windshield 10 and the optical device 20. The closed space S does not have to be sealed. For example, the closed space S may have a gap of an extent in which the air inside the closed space S and the air outside the closed space S (inside the vehicle cabin) does not actively circulate. The inner surface of the windshield 10 that is in the closed space S is divided into a first region a1 and a second region a2.

The first region a1 is the inner surface region of the windshield 10 that is within the angle of view of the optical device 20. Specifically, the first region a1 is the inner surface region of the windshield 10 that is within the angle of view of the optical unit 21 such as the imaging camera and the laser sensor. The first region a1 is a region that may affect the operation of the preventive safety system when the glass becomes, for example, foggy. In this regard, the anti-fogging portion 30 capable of suppressing the fogging of the windshield 10 is disposed in the first region a1.

The anti-fogging portion 30 may be, for example, an anti-fogging sheet as a component that has moisture absorbing properties and transmits visible light. The anti-fogging sheet can be attached to the first region a1 of the windshield 10 from the inner side of the vehicle cabin. The anti-fogging portion 30 may be disposed in the entire first region a1 or may be disposed at a part of the first region a1.

The second region a2 is the inner surface region of the windshield 10 that is out of the angle of view of the optical device 20. Specifically, the second region a2 is the inner surface region of the windshield 10 that is out of the angle of view of the optical unit 21 such as the imaging camera and the laser sensor. The second region a2 is a region that does not affect the operation of the preventive safety system even when the glass becomes, for example, foggy. The dew condensation portion 40 is disposed in the second region a2. Dew condensation is more likely to occur in the dew condensation portion 40 than in the first region a1.

The dew condensation portion 40 can be realized by, for example, the windshield 10 being formed such that the thickness of the windshield 10 is thinner in the second region a2 than in the first region a1. By the thicknesses being given to the windshield 10, the thermal conductivity of the second region a2 is improved more than the thermal conductivity of the first region a1. Accordingly, in a situation in which the glass is likely to become foggy, dew condensation is more likely to occur in the second region a2 than in the first region a1 as the temperature of the inner surface of the glass becomes lower in the second region a2 than in the first region a1. Examples of the situation include an outside air temperature being lower than the temperature in the vehicle cabin.

Alternatively, the dew condensation portion 40 can be realized by, for example, the windshield 10 being formed such that the surface area of the windshield 10 per coating area is larger in the second region a2 than in the first region a1. More specifically, the surface area of the glass per coating area is increased by unevenness being formed on the surface of the glass. When the windshield 10 is formed in this manner, the efficiency of heat exchange between the outside air and the inside air per coating area is improved more in the second region a2 than in the first region a1. Accordingly, in a situation in which the glass is likely to become foggy, dew condensation is more likely to occur in the second region a2 than in the first region a1 as the surface area of the glass undergoing a decline in temperature is wider in the second region a2 than in the first region a1. Examples of the situation include an outside air temperature being lower than the temperature in the vehicle cabin.

The dew condensation portion 40 may be disposed in the entire second region a2 or may be disposed at a part of the second region a2. In addition, the dew condensation portion 40 may be disposed continuously from the anti-fogging portion 30 or may not be disposed continuously from the anti-fogging portion 30 as illustrated in FIG. 2 (In other words, a gap may be formed between the dew condensation portion 40 and the anti-fogging portion 30).

Action and Effect

In the vehicular optical system 1 according to the embodiment, the anti-fogging portion 30 is disposed in the first region a1 of the inner surface of the transparent member 10 such as the windshield and the first region a1 is within the angle of view of the optical device 20 as described above. In addition, the dew condensation portion 40 is disposed in the second region a2 that is out of the angle of view of the optical device 20 and dew condensation is more likely to occur in the second region a2 than in the first region a1 as described above.

By this configuration being adopted, dew condensation by the dew condensation portion 40 can be preferentially performed (activation of dew condensation) before moisture absorption by the anti-fogging portion (anti-fogging sheet)

30, the moisture (water vapor) that is included in the closed space S and causes the transparent member 10 such as the windshield to become foggy is allowed to concentrate in the dew condensation portion 40, and thus the amount of the moisture in the anti-fogging portion 30 can be decreased. Accordingly, the anti-fogging portion 30 becomes unlikely to reach a moisture absorption limit and the anti-fogging properties of the first region a1 in front of the optical device 20 are improved. Therefore, the possibility of the vehicular optical system 1 not being operated properly by the inner surface (first region a1) of the transparent member 10 such as the windshield becoming foggy can be suppressed.

In the vehicular optical system 1 according to the present embodiment, the dew condensation portion 40 is realized by the shape (thickness and unevenness) of the transparent member 10 such as the windshield without any new configuration being added. Accordingly, an increase in the complexity of the structure of the system and a rise in system cost attributable to an increase in the number of components can be effectively avoided.

The above description is merely an example and the example is not limited by the above description.

The embodiment can be used in an optical system that is mounted in a vehicle and is useful in a case where, for example, the possibility of the system not being operated properly by a transparent member such as a windshield becoming foggy is to be suppressed with the transparent member in front of an optical device and within the angle of view of the optical device.

What is claimed is:

1. A vehicular optical system comprising:
   an optical device disposed to acquire information on an environment outside a vehicle cabin;
   a transparent member disposed on a front surface of the optical device via a predetermined closed space;
   an anti-fogging sheet disposed in a first region of an inner surface of the transparent member in the closed space, the first region being within an angle of view of the optical device; and
   a dew condensation portion disposed in a second region of the inner surface of the transparent member in the closed space, the second region being out of the angle of view of the optical device and dew condensation being more likely to occur in the dew condensation portion than in the first region, wherein
   the dew condensation portion is formed by a thickness of the transparent member being thinner in the second region than in the first region.

2. A vehicular optical system comprising:
   an optical device disposed to acquire information on an environment outside a vehicle cabin;
   a transparent member disposed on a front surface of the optical device via a predetermined closed space;
   an anti-fogging sheet disposed in a first region of an inner surface of the transparent member in the closed space, the first region being within an angle of view of the optical device; and
   a dew condensation portion disposed in a second region of the inner surface of the transparent member in the closed space, the second region being out of the angle of view of the optical device and dew condensation being more likely to occur in the dew condensation portion than in the first region, wherein
   the dew condensation portion is formed by a surface area of the transparent member per coating area being larger in the second region than in the first region.

3. The vehicular optical system according to claim 1, wherein the transparent member is a part of a windshield.

4. The vehicular optical system according to claim 2, wherein the transparent member is a part of a windshield.

\* \* \* \* \*